United States Patent [19]

O'Byrne

[11] Patent Number: 5,099,351
[45] Date of Patent: Mar. 24, 1992

[54] FOUR LEVEL FSK OPTICAL SIGNAL TRANSMISSION WITH OPTICAL DECODING AND COHERENT DETECTION

[75] Inventor: Vincent A. O'Byrne, Boston, Mass.
[73] Assignee: GTE Laboratories Incorporated, Waltham, Mass.
[21] Appl. No.: 460,452
[22] Filed: Jan. 3, 1990
[51] Int. Cl.[5] .......................................... H04B 10/00
[52] U.S. Cl. .................................................... 359/191
[58] Field of Search ....................... 372/23, 25, 28, 20; 455/616, 619, 617, 612, 618, 609, 610, 611, 613; 370/1, 3

[56] References Cited

U.S. PATENT DOCUMENTS 4,564,946  1/1986  Olsson ................................. 372/20
4,972,515 11/1990  Shibutani ........................... 455/619

FOREIGN PATENT DOCUMENTS 0314197  5/1989  European Pat. Off. ............ 455/619

Primary Examiner—Reinhard J. Eisenzopf
Assistant Examiner—L. Pascal
Attorney, Agent, or Firm—J. Stephen Yeo

[57] ABSTRACT

Apparatus for optical transmission of first and second digital channels. Each digital channel has first and second signal levels. The apparatus has a tunable laser for emitting an optical output at optical frequencies corresponding to current levels. An input which provides a current responsive to the signal levels of the two channels provides current levels to cause the laser to emit a first optical frequency when the first channel has a first signal level and the second channel has a second signal level, a second optical frequency when the first channel has a first signal level and the second channel has a first signal level, a third optical frequency when the first channel has a second signal level and the second channel has a first signal level, and a fourth optical frequency when the first channel has a second signal level and the second channel has a second signal level. An optical transmission medium is coupled to the output of the laser. A local oscillator provides a LO frequency. An envelope detector is coupled to the local oscillator and the transmission medium detects the optical frequency from the laser and provides an IF heterodyne frequency corresponding to the difference between the first LO frequency and the optical frequency from the laser. A mark is generated if the IF heterodyne frequency results from either the first or second optical frequency. The mark indicates a first signal level on the first channel.

2 Claims, 3 Drawing Sheets

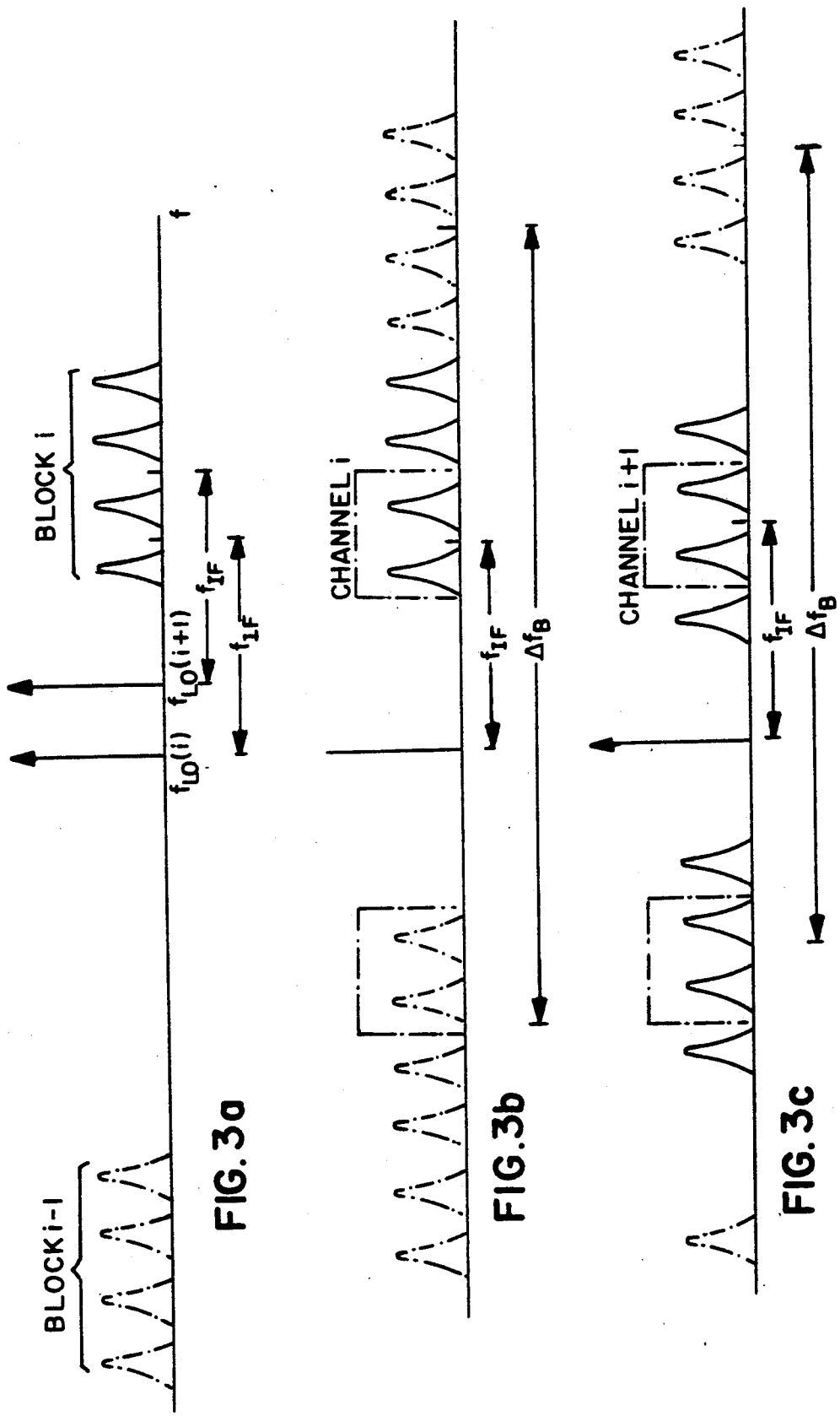

FOUR LEVEL FSK OPTICAL SIGNAL TRANSMISSION WITH OPTICAL DECODING AND COHERENT DETECTION

CORRESPONDING COPENDING APPLICATIONS

U.S. patent application Ser. No. 460,471 filed with this by the same assignee for FOUR LEVEL FSK OPTICAL SIGNAL TRANSMISSION WITH OPTICAL DECODING AND DIRECT DETECTION, pertains to a system similar to that described herein but using direct rather than coherent detection.

BACKGROUND OF THE INVENTION

The conventional procedure for the transmission of two independent FSK channels is to employ two independent lasers and modulate them individually to obtain two binary channels. The detection scheme can be either optical discrimination or by heterodyne detection. As two lasers are employed, both channels can be effectively on at the same time. Normally the use of one laser to transmit two independent data streams is precluded unless the symbol rate of the laser is increased, or a multilevel signal is transmitted to a complicated receiver.

An object of the invention is to provide apparatus allowing transmission of two independent FSK channels by one laser transmitting at the same symbol rate by appropriate coding and reception of one or both such channels by relatively simple coherent detection.

SUMMARY OF THE INVENTION

Briefly, apparatus for optical transmission of first and second digital channels. Each digital channel has first and second signal levels. The apparatus has a tunable laser for emitting an optical output at optical frequencies corresponding to current levels. Current means responsive to the signal levels of the two channels provides current levels to cause the laser to emit a first optical frequency when the first channel has a first signal level and the second channel has a second signal level, a second optical frequency when the first channel has a first signal level and the second channel has a first signal level, a third optical frequency when the first channel has a second signal level and the second channel has a first signal level and a fourth optical frequency when the first channel has a second signal level and the second channel has a second signal level. An optical transmission medium is coupled to the output of the laser. A local oscillator provides a LO frequency. An envelope detector is coupled to the local oscillator and the transmission medium detects the optical frequency from the laser and provides an IF heterodyne frequency corresponding to the difference between the first LO frequency and the optical frequency from the laser. A mark is generated if the IF heterodyne frequency results from either the first, or second optical frequency. The mark indicates a first signal level on the first channel.

BRIEF DESCRIPTION OF THE DRAWINGS

FIGS. 3a-3c shows how channel selection and optical decoding is accomplished in a multichannel system.

DETAILED DESCRIPTION OF THE INVENTION

Figure 1:
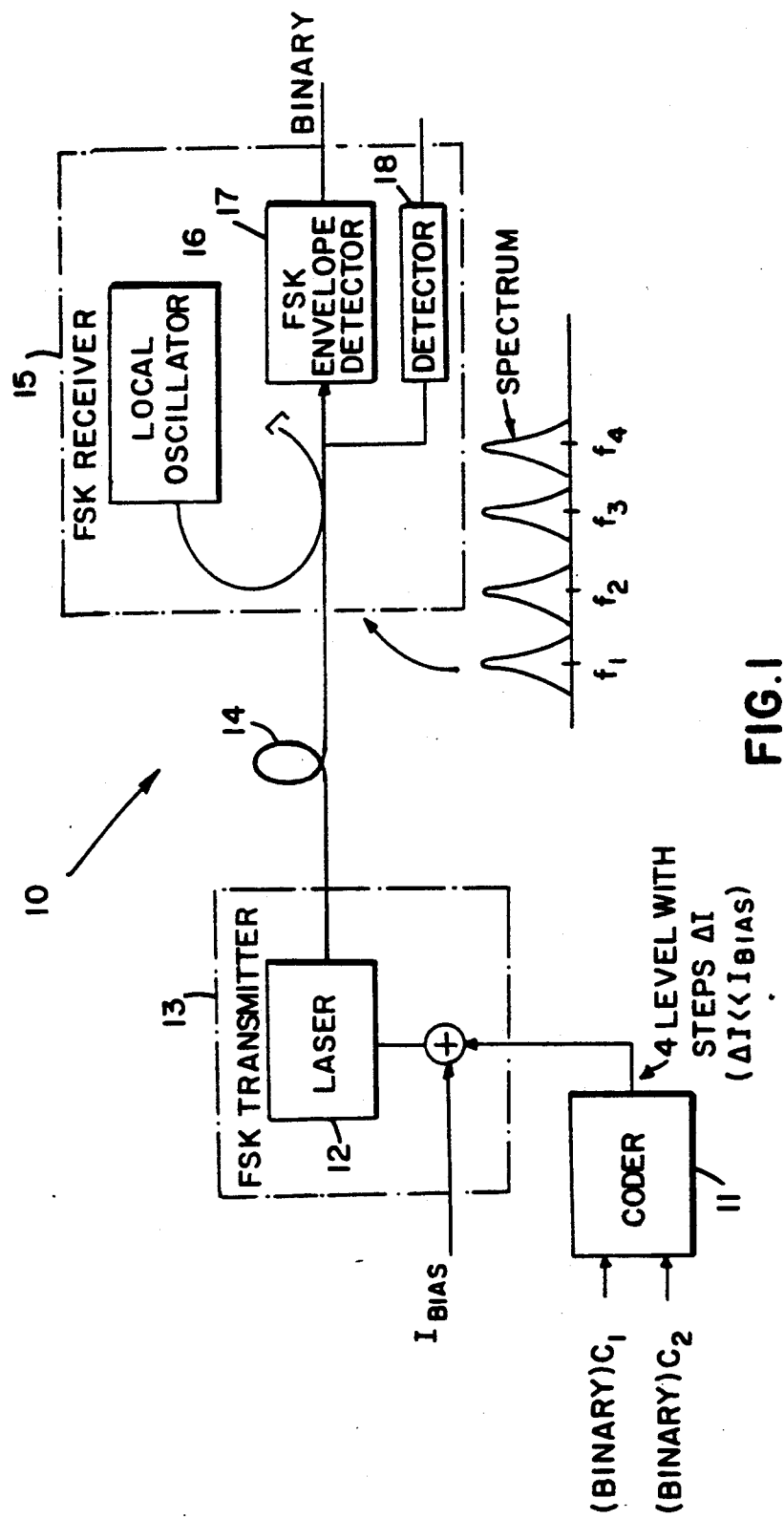
FIG. 1 is a block diagram of a system embodying the invention.

FIG. 1 is a block diagram of a system embodying the invention. The system codes a transmitted 4-level frequency shift keyed (FSK) signal so that signal can be optically heterodyne and coherently detected at a receiver.

The optical transmission system employs four level FSK combined with coherent detection at the receiver to allow transmission of two independent binary (two level) signals by a single diode laser transmitter. This arrangement uses one-half the number of diode lasers required in a multichannel optical FSK system with a relatively simple coherent receiver compared to other multilevel systems.

As channels are coded in pairs, the total power transmitted in the multichannel system is halved. However, a subscriber tuned to a particular channel will see the same power as if both channels were transmitted independently.

Figure 2:
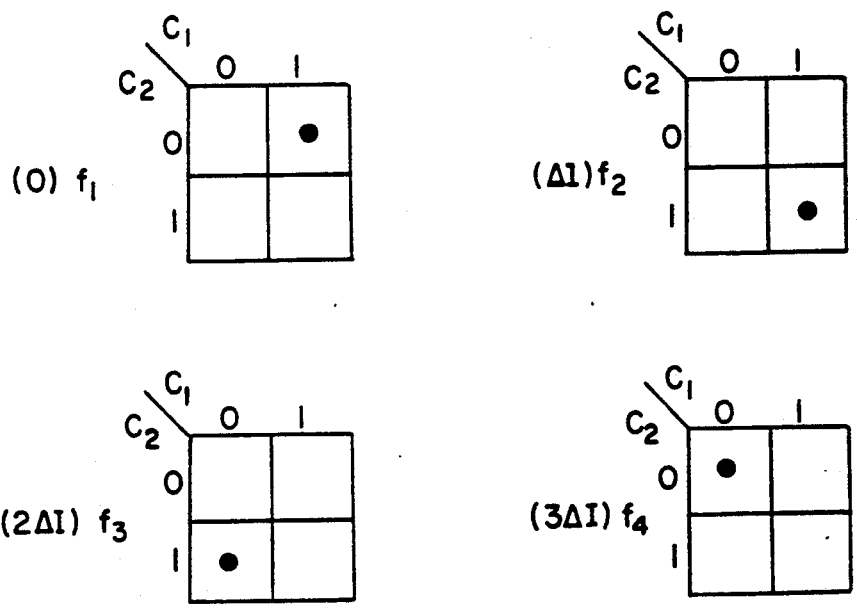
FIG. 2 shows an algorithm for current outputs of a coder used in the system of FIG. 1.

Referring to FIG. 1, the two digital channels ($C_1$ and $C_2$) to be transmitted are passed through coder 11 which converts the two binary channels into one output of 4 laser drive current levels. The coder 11 employs an algorithm, seen in FIG. 2, which assigns increasing or decreasing current levels to the output as the inputs vary in a fashion similar to a Gray code. The current output of coder 11 modulates bias current of transmitter laser 12 of FSK transmitter 13 and produces an FSK signal whose frequency corresponds to current variations. According to the algorithm zero current is output when a mark (one of two signal levels) is on channel 1 and a space is on channel 2. The FSK frequency varies in proportion to the impressed current variations ($\Delta I$). The output increases to $\Delta I$ when a mark is present on both channels. When a mark is present on channel 2 alone then the output is set to $2\Delta I$. For a space present on both channels the output is set to $3\Delta I$. Thus as the inputs change according to the Gray code the current output increases in a staircase fashion. Variations of the code are possible.

The coder is responsive to the signal levels of the two channels and provides current levels to cause laser 12 to emit a first optical frequency when the first channel has a first signal level and the second channel has a second signal level, a second optical frequency when the first channel has a first signal level and the second channel has a first signal level, a third optical frequency when the first channel has a second signal level and the second channel has a first signal level, and a fourth optical frequency when the first channel has a second signal level and the second channel has a second signal level.

The FSK signal from transmitter 13 traverses optical channel 14 to heterodyne receiver 15. The receiver converts the FSK signal by decoding the 4-level FSK signal into the baseband binary signals of either channel by appropriately tuning the LO frequency of local oscillator laser 16. Detection is by coherent FSK envelope detector 17 which is coupled to the optical channel 14 and local oscillator 16. Envelope detector 17 provides an IF heterodyne frequency corresponding to the difference between the LO frequency and the optical frequency from laser 12. The detector has a bandwidth to pass two adjacent IF heterodyne lobes. It provides a mark if the IF heterodyne frequency results from either said first or second optical frequency, thereby indicating a first signal level on the selected channel. Channel 1 or 2 may be selected by varying the LO frequency to change the IF heterodyne lobes passed.

FIG. 3 shows how channel selection and optical decoding is accomplished in a multichannel system. Each 4-level FSK signal may be considered as a block of 5 frequencies. Channel i, of block i, is optically decoded by tuning the local oscillator 16 so that the first two lobes of the 4-level FSK signal fall within the IF heterodyne bandwidth, as illustrated in FIG. 3(b). Channel i+1 is obtained by selecting the second and third lobes, as shown in FIG. 3(c). In this manner the 4-level FSK signal is optically decoded into its constituent binary signals, eliminating the need for high speed electronic demultiplexers.

Alternatively, a second envelope detector 18 may be coupled to local oscillator 16 and transmission medium 14 for detecting the optical frequency from laser 12 and providing an IF heterodyne frequency corresponding to the difference between the LO frequency and the optical frequency from laser 12 and for providing a mark if the IF heterodyne frequency results from either said second or third optical frequency, thereby indicating a first signal level on said second channel.

In a multichannel system each block is optically spaced by $\Delta f_B$ from its neighbor. The average optical spacing ($\Delta f_c$) between frequencies can be shown to be approximately given by;

$$\Delta f_c = \Delta f_b/2 \, f_{IF} + 6 \, f_d \qquad (1)$$

where $f_{IF}$ is the intermediate frequency and 2 $f_d$ is the frequency spacing between any adjacent lobes in any block.

It has been assumed that the upper lobes of blocks i and i−1 fall upon each other when heterodyne down to the IF as only the nearest undesired lobe is likely to cause interference.

The channel spacing ($\Delta f_C$) of conventional multichannel binary FSK may be represented by:

$$\Delta f_c \sim 2 f_{IF} + 4 \, f_d \qquad (2)$$

The described apparatus reduces the optical channel spacing required in a multichannel system when fIF is greater than $2 f_d$. This can result in up to a fifty percent reduction in the average channel spacing in the limit of a high $f_{IF}$.

The disclosed system doubles the channel capacity without increasing the speed of the laser drive circuitry, halves the number of transmitter lasers, stabilization circuits and incumbent electronics in a multichannel FSK system. As it employs optical decoding there is no need for high speed demultiplexing at the receiver. Furthermore there is no power penalty over a binary FSK system.

Apparatus has been described in which a novel multilevel FSK modulation/demodulation technique reduces the number of transmitters and their incumbent electronics by a factor of two in a multichannel system without any additional receiver sensitivity penalty. Variations and modifications will be apparent to skilled in the art in light of these teachings. Accordingly, the invention is to be defined by the following claims.

What is claimed is:

1. Apparatus for optical transmission of first and second digital channels, each digital channel having first and second signal levels, said apparatus comprising:
   a tunable laser for emitting an optical output at optical frequencies corresponding to current levels;
   current means responsive to the signal levels of said first and second channels for providing current levels to cause said laser to emit a first optical frequency when said first channel has a first signal level and said second channel has a second signal level, a second optical frequency when said first channel has a first level, a third optical frequency when said first channel has a second signal level and said second channel has a first signal level, and a fourth optical frequency when said first channel has a second signal level and said second channel has a second signal level;
   an optical transmission medium coupled to the output of said laser;
   a local oscillator for providing a first LO frequency; and
   a first envelope detector coupled to said local oscillator and said transmission medium for detecting the optical frequency from said laser and providing an IF heterodyne frequency corresponding to the difference between the first LO frequency and the optical frequency from said laser and for providing a mark if the IF heterodyne frequency results from either said first or said second optical frequency, thereby indicating said first signal level on said first channel, and providing an IF heterodyne frequency corresponding to the difference between the second LO frequency and the optical frequency from said laser and for providing a mark if the IF heterodyne frequency results from either said second or third optical frequency, thereby indicating said first signal level on said second channel.

2. The apparatus of claim 1 which further comprises:
   a second envelope detector coupled to said local oscillator and said transmission medium for detecting the optical frequency from said laser and providing an IF heterodyne frequency corresponding to the difference between the LO frequency and the optical frequency from said laser and for providing a mark if the IF heterodyne frequency results from either said second or third optical frequency, thereby indicating said first signal level on said second channel.

* * * * *